UNITED STATES PATENT OFFICE 2,925,361
Patented Feb. 16, 1960

2,925,361

STABLE BIOLOGICALLY ACTIVE CHLORINATED PHENOL COMPOSITION

Carol H. Bollenback, Maywood, Ill., assignor to Nalco Chemical Company, Chicago, Ill., a corporation of Delaware No Drawing. Application December 10, 1956
Serial No. 627,126

5 Claims. (Cl. 167—31)

This invention relates to a liquid extraction process for the removal of insoluble impurities contained in commercial grades of halogen substituted phenols. It is particularly concerned with new, chemically stable solutions containing halogen substituted phenols.

Halogen substituted phenols comprise a group of compounds having a wide variety of useful properties. These chemicals are well known for their ability to control and inhibit the growth of numerous species of microorganisms. They are used as biologically active agents in such industries as the paper, lumber, textile and agricultural industries and have been accepted as valuable aids in the prevention of waste and decay caused by the uncontrolled growth of microorganisms. These compounds are particularly effective in controlling microorganisms found in cooling towers and in water used to recover petroleum by secondary water-flood operations.

One of the most useful applications for these chemicals is the treatment of industrial process waters to mitigate and protect against molds, slimes and fungi of all types.

When halogen substituted phenols are employed in industrial processes it is usually the practice to use technical or commercial grades. Chemical refining or purification of halogen substituted phenols in the manufacturing process would place an increased cost on the product. Commercial grades are satisfactory in most cases since the products may be used as supplied, usually in the form of crystalline solids.

In some cases, however, it is beneficial to have the various halogen substituted phenols in the form of stable concentrated solutions. When commercial grades of halogen substituted phenols are dissolved in alkaline polar liquids such as water and/or alcohols the solutions will tend to throw out impurities in the form of crystals or fine particles which often act to precipitate active halogen substituted phenols. These impurities tend not only to make the solution unattractive but are not acceptable to most industrial users.

The impurities contained in halogen substituted phenols are for the most part inorganic salts such as sodium sulfate and the salts of such metals as copper and aluminum. Depending upon the particular manufacturing process employed, the impurities may not only be inorganic salts but may be metal complexes of organic materials. For a complete discussion of the various manufacturing processes for the several halogen substituted phenols see "Encyclopedia of Chemical Technology," vol. 10, p. 317 et subs., Interscience Publishers, 1953.

By analysis commercial grades of halogen substituted phenols have impurities present as biologically inert components ranging from about 1% by weight to as much as 15% by weight. Thus, a typical, technical grade of pentachlorophenol contains 83% by weight of pure pentachlorophenol, 12% of other mixed chlorinated phenols and 5% of inert ingredients. The dry sodium salt of a commercially available pentachlorophenol was found to contain 75% by weight of sodium pentachlorophenate, 13% of other sodium chlorophenates and 12% of inert ingredients. Similarly, other halogen substituted phenols contain inert, impure ingredients which tend to precipitate from solutions prepared therefrom. A certain percentage of these inert ingredients is usually insoluble in most polar solvents.

In using halogen substituted phenols as biologically active chemicals it is extremely advantageous if they are combined with certain other materials to render more effective their microbiological activity. In some cases mixtures of specific halogen substituted phenols give unexpected results when blended into liquid formulations.

It is therefore an object of the invention to provide a method of removing polar liquid insoluble impurities from commercial grades of chlorinated phenols.

Another object is to furnish chemically stable, concentrated solutions of halogen substituted phenols.

A further purpose is to combine specific halogen substituted phenols, either with or without other ingredients, into stable concentrated solutions, which are useful in controlling microorganisms in industrial process waters. Other objects will appear hereinafter.

In accordance with the invention it has been found that insoluble impurities contained in commercial grades of halogen substituted phenols may be removed from polar solvent solutions of these materials by treating such solutions with a minor, yet effective amount, of an aliphatic petroleum naphtha. By using such a solvent extraction technique, concentrated chemically stable solutions can be easily and conveniently produced.

The various halogen substituted phenols, containing insoluble manufacturing impurities, that may be used in the practices of the inventions include such substituted phenols as ortho-chlorophenol, para-chlorophenol 2,4-dichlorophenol, 2,4,5-trichlorophenol, 2,4,6-trichlorophenol, 2,3,4,6-tetrachlorophenol, pentachlorophenol, 4-chloro-meta-cresol, 4-chloro-3,5-xylenol and para-chloro-ortho-benzylphenol. The other well known substituted phenols as well as the corresponding bromo, iodo and fluoro-substituted phenols may be used.

To solubilize the halogen substituted phenols in polar solvents such as water or alcohol it is necessary to prepare the alkali metal phenates. This is most conveniently accomplished by adding with the halogen substituted phenol alkali such as an alkali metal hydroxide into the solvent in a stoimetric amount. The pH of the resulting solution should then be adjusted to give a pH of at least 8. The solutions produced by the practices of the present invention have a pH of at least 8 and preferably a pH of from 11.5 to 13.5.

The polar solvents found most useful in preparing the stable concentrated solutions of the invention comprise a mixture of a water soluble alcohol and soft water. These solvents may be combined in a weight ratio of alcohol to water of from 4:5 to 4:15 and preferably 2:3.

While any water soluble alcohol may be used in preparing the solvent combination, good results are obtained by using either diacetone alcohol or an alcohol of the formula

R—O(—C$_n$H$_2$O)$_x$—H where R is from the group consisting of hydrogen and lower alkyl groups of from 1 to 6 carbon atoms in chain length, $n$ is an integer of from 2 to 4 and $x$ is an integer of from 1 to 4.

Examples of such alcohols are ethylene glycol, propylene glycol, butylene glycol, diethylene glycol, triethylene glycol and the higher water soluble polyoxyalkylene glycols such as the several polyoxyethylene, polyoxypropylene and polyoxybutylene glycols as well as heteric mixtures thereof.

Especially good co-solvent alcohols are the lower alkyl ethers of glycols and polyoxyalkylene glycols. Several illustrative compounds are diethylene glycol monobutyl ether, ethylene glycol monobutyl ether, 1-methoxy-2-propanol, dipropylene glycol monomethyl ether and tripropylene glycol monomethyl ether. A particularly outstanding co-solvent is "Dowanol 93B2," manufactured by the Dow Chemical Company. This material is a mixture of mono-, di- and tripropylene glycol methyl ethers and has the following properties:

Pounds per gallon at 25° C. _____ 7.87
Refractive index at 25° C. _____ 1.416
Flash point _____ °F__ 134
Viscosity at 25° C. (centipoises) _____ 1.05
Pour point _____ °F__ 121
Specific gravity at 25/25° C. _____ 0.943–0.945

The soft water may be prepared by either distillation or by ion exchange techniques and should not have a total hardness (as $CaCO_3$) exceeding ½ grain per gallon and preferably not more than 1 part per million. It was found that when water, such as Chicago tap water, was used to prepare compositions of the invention undesirable solution cloudiness occurred.

When commercial grades of alkali metal halogen substituted phenates are added to solvent mixtures of the types described and the pH adjusted to between 8 and 11.5 the impurities from the phenates begin to separate in periods of time, ranging from a few minutes to as much as a few days, depending upon the ingredients used, temperature and the particular solvent chosen.

It was found that these impurities could be rapidly removed by adding to the solutions from 2% to 5% and preferably 3% to 4% by weight of an immiscible aliphatic petroleum naphtha. After a slight mixing period the treated solution is allowed to stand for a period of time sufficient to permit the naphtha to rise to the top of the solution. Contained in the naphtha layer are the impurities which may be separated from the mix by decantation, withdrawal of the finished solution from the top naphtha layer by appropriate drainage techniques, centrifugal separation or filtration.

The solvent immiscible aliphatic naphthas include petroleum distillate solvents having boiling ranges from about 110° to 400° F. and an aromatic content not exceeding 20%. They include such products as Stoddard solvent, varnish makers' naphtha and rubber solvent naphtha which is distilled from a paraffin base crude. Of these solvents the best results have been obtained using Stoddard solvent.

As will be shown later, in some instances it is desirable to incorporate into the finished liquid solutions a minor amount of a non-ionic water soluble wetting agent.

As an aid to preparing the compositions of the invention there is listed below a general formula of the ingredients used.

GENERAL FORMULA

| Ingredients | Percent by Weight |
| --- | --- |
| A. Halogen substituted alkali metal phenate: | |
| (1) General Range | 15–35 |
| (2) Preferred Range | 24–35 |
| B. Water Soluble Alcohol: | |
| (1) General Range | 20–60 |
| (2) Preferred Range | 25–45 |
| C. Soft water: | |
| (1) General Range | 25–75 |
| (2) Preferred Range | 25–35 |
| D. Non-ionic wetting agent: | |
| (1) General Range | 2–10 |
| (2) Preferred Range | 2–5 |
| E. Aliphatic petroleum naphtha: | |
| (1) General Range | 2–5 |
| (2) Preferred Range | 3–4 |
| F. Alkali metal hydroxide sufficient to adjust the pH to at least 8. | |

In the above formula the non-ionic wetting agent is an optional, yet desirable, ingredient. When it is not included in the composition a compensating amount of water soluble alcohol or soft water may be used.

In order to further illustrate the formulating techniques that may be employed, the following is given by way of example.

*Example 1*

The chemicals listed below constituted a charge to a reaction vessel fitted with an outlet at the bottom thereof and a mechanical stirrer.

| Chemical | Percent by Weight |
| --- | --- |
| Pentachlorophenol | 16 |
| 2,4,5-trichlorophenol | 8 |
| Dowanol 93-B2 | 25 |
| Stoddard Solvent | 3 |
| Dodecyl alcohol reacted with 9 mols of ethylene oxide | 3 |
| Soft water | 32 |
| Potassium hydroxide (45% Solution) | 13 |

The chemicals were added and mixed in the order given. The chlorinated phenols were not solubilized until the potassium hydroxide was added. After all the ingredients were mixed the product was allowed to stand for 4 hours. During this time fine dust size particles floated to the top of the mixture with, and were entrained in, the Stoddard solvent. The remaining clear brown liquid product was withdrawn from the bottom of the vat. The product was stable and microbiologically active after 9 months of storage at room temperature.

The physical characteristics of the finished product were as follows:

Color _____ Amber.
Specific gravity at 60° F. _____ 1.164.
Flash point (Cleveland open cup) ___ Boiled at 205° F.
Fire point _____ 212° F.
Cloud point (ASTM) _____ −11 °F.
pH _____ 13.1.

A sample of this batch was stored at 8° F. for 12 hours, then allowed to warm to room temperature, cooled again, etc. After 10 changes of temperature and 4 weeks of storage the formula showed no evidence of clouding or precipitation.

Another sample of the above product was used to test the corrosiveness of the formula. Small steel and brass coupons of the grades used in shipping containers and fittings therefor were submerged and partially submerged in the test solution under conditions simulating actual drum storage and use patterns. The corrosion rate on the partially submerged steel coupon was 2.4 mils per year. For the fully submerged steel and brass coupons it was 1.1 and 1.6 mils per year, respectively. No gas formation was evident.

For purposes of comparison the same formula was prepared without using Stoddard solvent. Precipitation was evident within 3 to 7 days and the product was not deemed suitable for commercial usage.

In formulating numerous compositions it was discovered the best solutions were prepared if potassium hydroxide was used. While other alkalies give satisfactory results, it was shown that potassium hydroxide was superior.

The chemical solutions prepared in accordance with the invention possess outstanding characteristics when used to control microorganisms. By incorporating into the formula 2% to 10% by weight of a non-ionic wetting agent the utility of the formula is multiplied since better surface contact of the active chemical with the object to be treated is achieved. When used to treat microorganisms the non-ionic wetting agents increase cell permeability and allow the halogen substituted phenols to more readily enter the cell wall and act upon the intercellular components, including the cytoplasm and the mitochrondrial body. When liquid formulae containing non-ionic wetting agents are used to treat accumulated masses of slime and fungi, such as commonly occur in paper mills, the wetting agent will disperse these masses into the system in the form of fine non-agglomerated particles and prevent the sloughing of the masses in the form of large pieces which often interfere with the operation of machinery used in the papermaking process.

A comprehensive list of non-ionic wetting agents is given in the publication, "Synthetic Detergents, Up to Date," by John W. McCutcheon, Soap and Sanitary Chemicals, July-October 1952.

Liquid formulations of the invention containing as their biologically active ingredients a mixture of pentachlorophenol and 2,4,5-trichlorophenol, as their alkali metal salts, give outstanding and surprisingly unexpected results when used in the treatment of industrial process waters to prevent and mitigate slimes, molds and fungi commonly occurring in such systems. For the best results it is desirable to combine the alkali metal pentachlorophenate and alkali metal 2,4,5-trichlorophenate in a weight ratio of from 1:1 to 4:1 and preferably 2:1. A very desirable formulation is achieved by combining from 2% to 10% by weight of a non-ionic wetting agent of the type described in the formulation. Thus, a typical, highly potent formula might be prepared using the general composition shown below as a guide.

| Ingredients | Percent by Weight |
| --- | --- |
| Alkali metal pentachlorophenate | 16-24 |
| Alkali metal 2,4,5-trichlorophenate | 8-12 |
| Water soluble alcohol | 24-45 |
| Soft water | 25-35 |
| Non-ionic wetting agent | 2-10 |
| Caustic sufficient to adjust the pH from 11.5 to 13.5. | |

To illustrate the beneficial effects of the combination of alkali metal pentachlorophenates, 2,4,5-trichlorophenates and non-ionic wetting agent versus alkali metal pentachlorophenates alone, the next example is given.

*Example II*

The test method was essentially a U.S.D.A. phenol coefficient test procedure with the sampling times being 1, 6 and 24 hours, respectively, with subculturing being made at the same time. The test organisms were *Aerobacter aerogenes*, *Aspergillus niger* and Monilia.

The results were recorded in terms of parts per million necessary to achieve a total kill on the test organisms at a culture media pH of 5.0. The sodium pentachlorophenate was compared with equivalent amounts of potassium pentachlorophenate and potassium 2,4,5-trichlorophenate as contained in the formula prepared in Example I. The results of these tests are listed below in Table I.

TABLE I

A. SODIUM PENTACHLOROPHENATE

| Hrs. | A. aerogenes | A. niger | Monilia |
| --- | --- | --- | --- |
| 1 | 50-100 | 100-200 | 100-200 |
| 6 | 25-50 | 50-100 | 50-100 |
| 24 | 25-50 | 25-50 | 50-100 |

B. COMPOSITION OF EXAMPLE I

| | | | |
| --- | --- | --- | --- |
| 1 | 31-62 | 31-62 | 15-31 |
| 6 | 15-31 | 15-31 | 8-16 |
| 24 | 8-16 | 8-16 | 2-4 |

To further demonstrate the microbiological activity of the liquid formulations of the invention, the following example is given.

*Example III*

The liquid product prepared in Example I was subjected to several tests to further prove its efficacy.

One method employed was that described by Bollenback and Cruickshank in "Analytical Chemistry," vol. 26, p. 1355, August 1954. In this method the number of parts per million (p.p.m.) of the active compound to kill *A. aerogenes* in a contact time of one hour is determined using an inoculum prepared by adjusting an 18 to 20 hour broth culture of *A. aerogenes* to approximately two million organisms per ml. in distilled water immediately before use in the test. The adjusted culture is used within five minutes after its preparation and the test is carried out with one ml. of a 0.1% stock solution of the chemical to be tested. This method establishes a killing range for the chemical tested.

To determine the microbiological inhibition properties of the formula prepared in Example I, a gas tube method was used. In this test the culture medium used consisted of 24 grams of dextrose, 1 gram of Basaminbact (Anheuser Busch), added to 1 liter of Chicago tap water and sterilized by autoclaving under 15 pounds of pressure for 15 minutes. An appropriate amount of 18 to 24 hour nutrient broth culture of *A. aerogenes* or *A. niger* was mixed with 200 ml. of the culture medium immediately before starting tests. The amount of culture was such as to give one million organisms per ml. of medium. 20 ml. of the inoculated culture medium was placed in each of a series of fermentation tubes with caps. Without touching the sides of the tubes a given amount of chemical to be tested was introduced using an appropriate concentration of stock chemical to avoid more than a 5% error in final dilution. For this purpose the volume of chemical introduced should be 1 ml. of less. The chemical and the inoculated medium were mixed gently. A control test was also run in which the chemical was omitted. In mixing, each tube was inverted in such a manner as to fill the upright closed end of the tube with the test liquid. The tubes were incubated at 30° C. for 24 hours. At the end of 1 hour contact and again after 24 hours contact a loopful of the test mixture was withdrawn from each tube and inoculated in a subculture tube containing 10 ml. of sterile nutrient broth. The subculture tubes were incubated at 37° C. for 48 hours and examined for growth. The results of these tests indicated 1 and 24 hour killing ranges. The gas production for inhibition level was recorded at 48 hours.

The results obtained, as well as other characteristics are shown in Table II below:

TABLE II

TEST PERFORMANCE

| | | |
| --- | --- | --- |
| *A. aerogenes:* | | |
| 1 hr. plate kill | 125-250 p.p.m. | |
| Gas tube test | pH 5 | pH 8 |
| 1 hr. kill | 100-200 | >200 |
| 24 hr. kill | 50-100 | >200 |
| Inhibition | 50-100 | 100-200 |
| Adsorption by Fiber, percent | 90 | |
| *A. niger:* | | |
| Gas tube test | pH 5 | pH 8 |
| 1 hr. kill | >200 | >200 |
| 24 hr. kill | 25-50 | >200 |
| Inhibition | 10-25 | 25-50 |

The above tests conclusively demonstrate the liquid formulations disclosed herein are effective in the control of microorganisms. These formulations have been proven stable under normal conditions of use and are ideally suited for use in treating many industrial process waters.

In the specification and claims the expression "alkali metal halogen substituted phenates" or its equivalent has been used with reference to weight percents in conjunction with formulae and the preparation of formulae. It is to be understood that these weights were based on the weight of the potassium salts and where other alkali metal salts are employed equivalent weights should be used.

The term "biologically active agent" as used herein is meant to define a substance or material which will act to the detriment of microorganisms and/or biological growth.

The invention demonstrates a new and useful method of preparing chemically stable, biologically active compositions. It has been the experience of the art that whenever concentrated solutions of commercial grades of halogen substituted phenols are prepared precipitation occurs. By removing the inert impurities from the solutions, a desirable stable liquid product is afforded which is of great value to many branches of industry.

The invention is hereby claimed as follows:

1. A chemically stable, biologically active liquid having a pH of at least 8 comprising

| Ingredients | Percent by Weight |
|---|---|
| A. Chlorine substituted alkali metal phenate from the group consisting of sodium and potassium chlorine substituted phenates | 15-35 |
| B. Water Soluble Alcohol | 16-64 |
| C. Soft Water | 25-75 | said liquid having been formulated with commercial grades of chlorine substituted phenols and an amount of an immiscible aliphatic petroleum naphtha sufficient to remove the insoluble impurities from said liquid, the said immiscible aliphatic petroleum naphtha containing such impurities having been removed during formation.

2. The composition of claim 1 wherein "ingredient A" is a chloro-substituted potassium phenate.

3. A chemically stable, biologically active liquid having a pH of at least 8 comprising

| Ingredients | Percent by Weight |
|---|---|
| A. Chlorine substituted alkali metal phenate from the group consisting of sodium and potassium chlorine substituted phenates | 15-35 |
| B. Water soluble alcohol | 20-60 |
| C. Soft water | 25-75 |
| D. Non-ionic disperant | 2-10 | said liquid having been formulated with commercial grades of chlorine substituted phenols and an amount of an immiscible aliphatic petroleum naphtha sufficient to remove the insoluble impurities from said liquid, the said aliphatic petroleum naphtha containing such impurities having been removed during formation.

4. The composition of claim 3 wherein "ingredient A" is a chloro-substituted potassium phenate.

5. The composition of claim 3 wherein the chlorine substituted alkali metal phenate is a mixture of alkali metal pentachlorophenate and 2,4,5-trichlorophenate from the group consisting of sodium and potassium pentachlorophenates, combined in a weight ratio of from 1:1 to 1:4 and the water soluble alcohol is from the group consisting of diacetone alcohol and an alcohol of the formula $$R-O(-C_nH_{2n}O)_x-H$$

where R is from the group consisting of hydrogen and lower alkyl groups from 1 to 6 carbon atoms in chain length, $n$ is an integer of from 2 to 4 and $x$ is an integer of from 1 to 4, said water soluble alcohol being present with the soft water in a weight ratio of from 4:5 to 4:15.

References Cited in the file of this patent

UNITED STATES PATENTS

| | | |
|---|---|---|
| 1,085,783 | Aylsworth | Feb. 3, 1914 |
| 2,253,762 | Carswell et al. | Aug. 26, 1941 |
| 2,322,633 | Hitchens | June 22, 1943 |
| 2,650,892 | Fane | Sept. 1, 1953 |
| 2,755,307 | Nicholaisen | July 17, 1956 |
| 2,782,242 | Clark | Feb. 19, 1957 |

OTHER REFERENCES

Soap and Sanitary Chem., June 1948, p. 167.

Palmer et al.: The Ohio Jour. of Sci., vol. 55 (1): Jan. 1, 1955, pp. 1-3.

Atlas Spans and Atlas Tweens, Surface Active Agents, November 1942, pp. 4 and 7.

Glycols, Carbide and Carbon Chem. Corp., Mar. 31, 1947, pp. 1 and 6.

UNITED STATES PATENT OFFICE
CERTIFICATE OF CORRECTION

Patent No. 2,925,361                  February 16, 1960

Carol H. Bollenback

It is hereby certified that error appears in the printed specification of the above numbered patent requiring correction and that the said Letters Patent should read as corrected below.

Column 2, line 60, the formula should appear as shown below instead of as in the patent:

$$R-O(C_nH_{2n}O)_x-H$$

column 7, line 36, in the second table, first column thereof, last line, for "disperant" read -- dispersant --.

Signed and sealed this 29th day of November 1960.

(SEAL)
Attest:

KARL H. AXLINE
Attesting Officer

ROBERT C. WATSON
Commissioner of Patents